US010585442B2

(12) United States Patent
Lichtash

(10) Patent No.: US 10,585,442 B2
(45) Date of Patent: Mar. 10, 2020

(54) SECURING PRODUCT STORAGE TANKS AGAINST UNAUTHORIZED DELIVERY

(71) Applicant: SONECO LLC, Rockville, MD (US)

(72) Inventor: Avraham Shmuel Lichtash, N. Bethesda, MD (US)

(73) Assignee: SONECO LLC, Rockville, MD (US)

( * ) Notice: Subject to any disclaimer, the term of this patent is extended or adjusted under 35 U.S.C. 154(b) by 33 days.

(21) Appl. No.: 15/966,200

(22) Filed: Apr. 30, 2018

(65) Prior Publication Data
US 2018/0246534 A1 Aug. 30, 2018

Related U.S. Application Data

(63) Continuation of application No. 15/358,736, filed on Nov. 22, 2016, now Pat. No. 9,964,962, which is a continuation of application No. 14/117,562, filed as application No. PCT/US2012/050287 on Aug. 10, 2012, now Pat. No. 9,523,978.

(60) Provisional application No. 61/522,502, filed on Aug. 11, 2011.

(51) Int. Cl.
G05D 7/06 (2006.01)
B67D 7/36 (2010.01)
B67D 7/34 (2010.01)
G05B 19/042 (2006.01)
G06Q 10/08 (2012.01)
G05B 19/18 (2006.01)
B67D 7/04 (2010.01)

(52) U.S. Cl.
CPC ........... *G05D 7/0676* (2013.01); *B67D 7/346* (2013.01); *B67D 7/348* (2013.01); *B67D 7/36* (2013.01); *G05B 19/042* (2013.01); *G05B 19/18* (2013.01); *G06Q 10/0832* (2013.01); *B67D 7/04* (2013.01); *G05B 2219/15117* (2013.01); *G05B 2219/36536* (2013.01)

(58) Field of Classification Search
None
See application file for complete search history.

(56) References Cited

U.S. PATENT DOCUMENTS

| | | | |
|---|---|---|---|
| 2,620,822 A | 12/1952 | Peterson et al. | |
| 3,522,670 A * | 8/1970 | Todd | E02F 3/8858 114/264 |
| 3,822,866 A | 7/1974 | Daester et al. | |
| 4,254,328 A * | 3/1981 | Murray | B67D 7/308 222/14 |
| 4,553,573 A * | 11/1985 | McGarrah | B67D 1/04 137/267 |
| 4,658,857 A | 4/1987 | Ayres, Jr. | |
| 4,690,306 A | 9/1987 | Staheli | |
| 4,830,230 A * | 5/1989 | Powers | G01F 3/065 222/334 |
| 4,932,005 A * | 6/1990 | Birdwell | E21B 47/18 175/48 |
| 5,222,027 A * | 6/1993 | Williams | B67D 7/744 222/1 |

(Continued)

Primary Examiner — Ramesh B Patel
(74) Attorney, Agent, or Firm — Nixon & Vanderhye P.C.

(57) ABSTRACT

A system and method prevent product-type contamination in a bulk liquid storage tank. A control unit receives an indication of a storage product type in the bulk storage and a delivery product type in the tanker truck. The control unit compares the delivery product type with the storage product type and controls delivery based on a result of the comparison.

10 Claims, 13 Drawing Sheets

(56) References Cited

U.S. PATENT DOCUMENTS

| | | | | |
|---|---|---|---|---|
| 5,359,522 A * | 10/1994 | Ryan | ........................ | B67D 7/08 705/413 |
| 5,420,775 A * | 5/1995 | Kusmer | .................... | B65D 5/42 362/376 |
| 5,590,812 A * | 1/1997 | Miyao | ..................... | G07F 11/26 221/112 |
| 6,347,723 B1 * | 2/2002 | Barlian | .................. | B67D 7/344 141/231 |
| 6,449,869 B1 * | 9/2002 | Bretschneider | .......... | A01C 1/06 34/166 |
| 6,611,755 B1 * | 8/2003 | Coffee | .................... | B28C 5/422 340/438 |
| 7,028,865 B2 * | 4/2006 | Heukamp | ............. | B05B 11/007 222/207 |
| 7,292,993 B2 * | 11/2007 | Uzzo | ........................ | G01F 23/00 705/22 |
| 8,905,089 B2 * | 12/2014 | Evans | ..................... | G05D 7/0617 141/231 |
| 9,133,013 B2 * | 9/2015 | Roys | ....................... | B67D 7/344 |
| 9,523,978 B2 * | 12/2016 | Lichtash | ................. | B67D 7/346 |
| 9,964,962 B2 * | 5/2018 | Lichtash | ................. | B67D 7/346 |
| 2005/0070391 A1 * | 3/2005 | Folsom | ................. | B60K 17/046 475/23 |
| 2006/0157149 A1 | 7/2006 | Hillam | | |
| 2006/0206246 A1 * | 9/2006 | Walker | ................... | G06Q 10/00 701/16 |
| 2008/0091309 A1 * | 4/2008 | Walker | .................... | B60R 25/02 701/1 |
| 2009/0293654 A1 | 12/2009 | Pintauro | | |
| 2009/0314384 A1 * | 12/2009 | Brakefield | ................ | B67D 7/04 141/67 |
| 2011/0120589 A1 * | 5/2011 | Evans | .................... | G05D 7/0617 141/1 |
| 2011/0287166 A1 * | 11/2011 | Dunajtschik | ......... | A23G 3/0095 426/665 |
| 2012/0150344 A1 * | 6/2012 | Jennings | .................. | B67D 7/04 700/244 |
| 2016/0045841 A1 * | 2/2016 | Kaplan | ................ | B01J 19/0093 429/49 |
| 2016/0117636 A1 * | 4/2016 | Miller | ................ | G06Q 10/0832 705/332 |

* cited by examiner

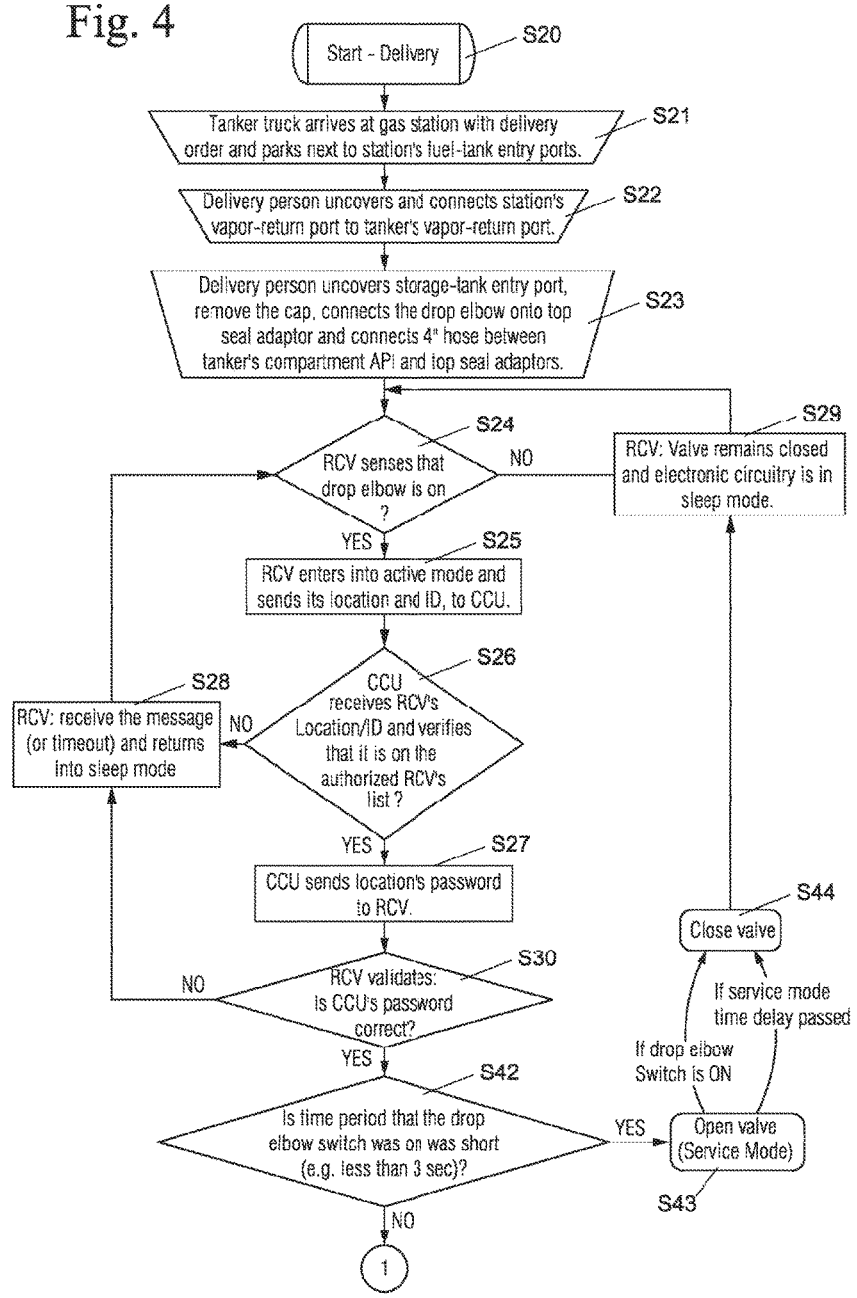

SECURING PRODUCT STORAGE TANKS AGAINST UNAUTHORIZED DELIVERY

CROSS-REFERENCES TO RELATED APPLICATIONS

This application is a continuation of U.S. patent application Ser. No. 15/358,736, filed Nov. 22, 2016, now U.S. Pat. No. 9,964,962, which is a continuation of U.S. patent application Ser. No. 14/117,562, filed Nov. 13, 2013, now U.S. Pat. No. 9,523,978, which is the U.S. national phase of PCT International Patent Application No. PCT/US2012/050287 filed Aug. 10, 2012, which claims the benefit of U.S. Provisional Patent Application No. 61/522,502, filed Aug. 11, 2011, the entire contents of each of which are hereby incorporated by reference in this application.

STATEMENT REGARDING FEDERALLY SPONSORED RESEARCH OR DEVELOPMENT (NOT APPLICABLE)

BACKGROUND

The invention relates to product delivery control and, more particularly, to securing product storage tanks against unauthorized delivery.

Retail facilities selling liquid products stored in liquid storage tanks (e.g., gas stations) are located throughout the world. In the case of petroleum, products are stored in bulk storage tanks, which are typically located underground. Each tank stores a unique petroleum product (e.g., gasoline, diesel, kerosene, etc.) to be dispensed through pump-dispensers at various retail facilities. The delivery of petroleum products (hereinafter, fuel) to retail facilities is conducted by a gravity drop from a compartment in a tanker truck. These tanker trucks are themselves loaded for delivery from larger tank systems located at wholesale distribution centers.

Preventing unauthorized fuel delivery is desirable for automotive fuel brands to maintain their brand products' exclusivity in the franchise retail gas stations, for fuel distributors in order to fulfill their exclusive relationships with retail gas stations, and to prevent contamination or improper mixing of fuel products. A business goal of fuel distributors is to minimize unauthorized deliveries while maximizing the efficiency of authorized delivery operations. Unauthorized deliveries may take place at a time of fuel price fluctuations. When prices go down, the owner of a retail gas station might be tempted to purchase fuel from a freelance distributer at a lower price, breaching the long-term supply contract with a distributor.

Typically, distributors keep close track of their customers' inventory, but in practice, even with well monitored retail gas stations, distributors report that unauthorized deliveries cause them a loss of 2-20% of their total business. That is a loss of between 1.75 million and 17.5 million PER DAY for authorized distributors in the United States during the first six months of 2011 (calculation based on data from the Prime Supplier Report and the U.S. Energy Information Administration, which report that in the first half of 2011, total gasoline sales and deliveries was approximately 350 million gallons per day with an average distributor's margin of 50.25 per gallon).

Current methods for preventing unauthorized delivery of liquid cargo into a storage tank includes the collection and comparison of point-in-time storage tank levels, storage volume history and delivery records for a retail station. If a deviation is found, the dealer representative works with the retail station manager to investigate and correct the situation. This method fails to prevent unauthorized delivery because (a) it is post factum and, under the circumstances, it is difficult to prove wrongdoing, (b) an investigation typically has a negative effect on the distributor-customer relationship, (c) it is costly, and (d) it doesn't provide a means to prevent product-type contamination due to human error.

Remote controlled valves have been previously used in other industries (e.g., water irrigation system), but have not been suitable for fuel or other industrial liquid products because (a) they do not support bulk liquid drops at very low hydrostatic pressure, (b) they are not effective for bidirectional flow, (c) they are hard to use in a flammable explosive environment, (d) they are not suited for battery operation due to energy consumption, and (e) they are typically unreliable, expensive, and difficult to use. The RCVs used herein are suitable for allowing rapid bulk-liquid drops at any hydrostatic pressure, supporting bi-directional liquid flow and handling flammable liquids securely, including supporting ongoing maintenance, inspection and auditing activities without compromising on safety or security.

BRIEF SUMMARY

The described embodiments overcome the shortcomings of existing delivery systems by (a) providing automatic, real-time prevention of unauthorized deliveries, (b) eliminating post factum investigations, (c) minimizing the size of the professional control team, and (d) ensuring the quality of the delivered product by preventing contamination.

The described embodiments are independent of the delivered product type and are applicable for any industrial product (liquid or otherwise flowable, e.g., granular) for which unauthorized delivery or contamination by improper mixing of product types can occur. For convenience, the Detailed Description is provided in terms of fuel distribution, which is a highly applicable market for the described embodiments. The challenges faced by distributors in the fuel market are also the same as in other markets, e.g., milk, juice or hazardous agricultural liquids such as fertilizers and pesticides.

In an exemplary embodiment, a method of preventing contamination by a tanker truck in a bulk liquid storage tank may include the steps of (a) providing an identification transmitter at an entry port of the bulk liquid storage tank, the identification transmitter storing an indication of a storage product type in the bulk storage tank; (b) communicating a delivery product type in the tanker truck to control circuitry in the tanker truck; (c) the identification transmitter communicating the storage product type to the control circuitry; and (d) the control circuitry comparing the delivery product type with the storage product type and controlling delivery based on a result of the comparison.

In another exemplary embodiment, a system for preventing contamination by a tanker truck in a bulk liquid storage tank may include an identification transmitter positioned adjacent an access to the bulk liquid storage tank, where the identification transmitter is configured to store an indication of a storage product type in the bulk storage tank. A drop elbow may connect the tanker truck to the liquid storage tank, where the identification transmitter may include a sensor that is configured to identify when the drop elbow has been connected. Control circuitry communicating with the identification module may be configured to identify a delivery product type in the tanker truck and to compare the delivery product type in the tanker truck with the storage product type. The control circuitry may be configured to control delivery of the delivery product type based on a result of the comparison.

BRIEF DESCRIPTION OF THE DRAWINGS

These and other aspects and advantages will be described in detail with reference to the accompanying drawings, in which.

DETAILED DESCRIPTION

Figure 1:
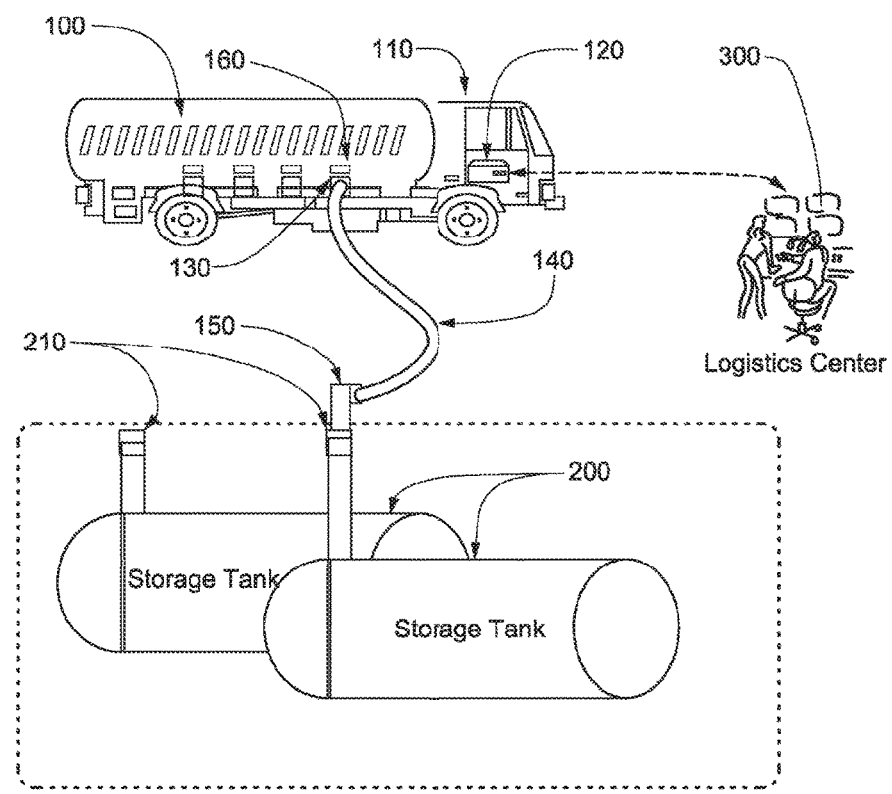
FIG. 1 is a schematic drawing showing a general overview of the system.

The invention includes methods, systems, computer software and products associated with securing storage tanks against the unauthorized transfer of flowable product from delivery vehicles (e.g., tanker trucks and rail cars) or the unauthorized loading of products from a storage tank into a delivery vehicle.

With reference to the drawings, the system is comprised generally of a remote controlled valve (hereinafter, RCV), which is installed at the entry port of a liquid storage tank 210 and controls liquid flow into or out of the liquid storage tank 200. A command and control unit (hereinafter, CCU) 120 is installed in the cabin 110 of a tanker truck 100 or in a handheld mobile device, which controls the delivery process and includes product type push buttons that open the RCV to full flow. Other components include a visual display 120-2, embedded audible alarm 120-3 to report on delivery status, RCV status, and system error indicator 102-5. A tanker has several compartments, each containing a specific product. Product type display units (hereinafter, PTDUs) 160 are installed next to each compartment dispensing port 130. The PTDU 160 is manually set at the fuel depot station by the delivery person, which typically is the tanker truck driver, to display the type of product in the associated compartment (e.g., diesel, regular gasoline, etc.) at the time of product loading with optional active components that will communicate the product type to the CCU. The product type push button can be also embedded in the PTDU 160-2. Each RCV carries saved information about the storage tank volume and product type. The delivery person will be required to confirm that the product type for delivery is the same type as the one in the storage tank prior to the delivery by pressing the correct fuel type push button. Alternatively, this process can be replaced by an automatic process with a front end interface 160-5 (RF or wired), assuming the information about each compartment product type will be stored during the loading time at the fuel depot by means of retrieving the fuel depot loading arms at the time of loading.

A communication link between the CCU and the RCV ensures that only a pre-authorized CCU is granted access privileges to unload fuel into a liquid storage tank.

Operational Process

Figure 2:
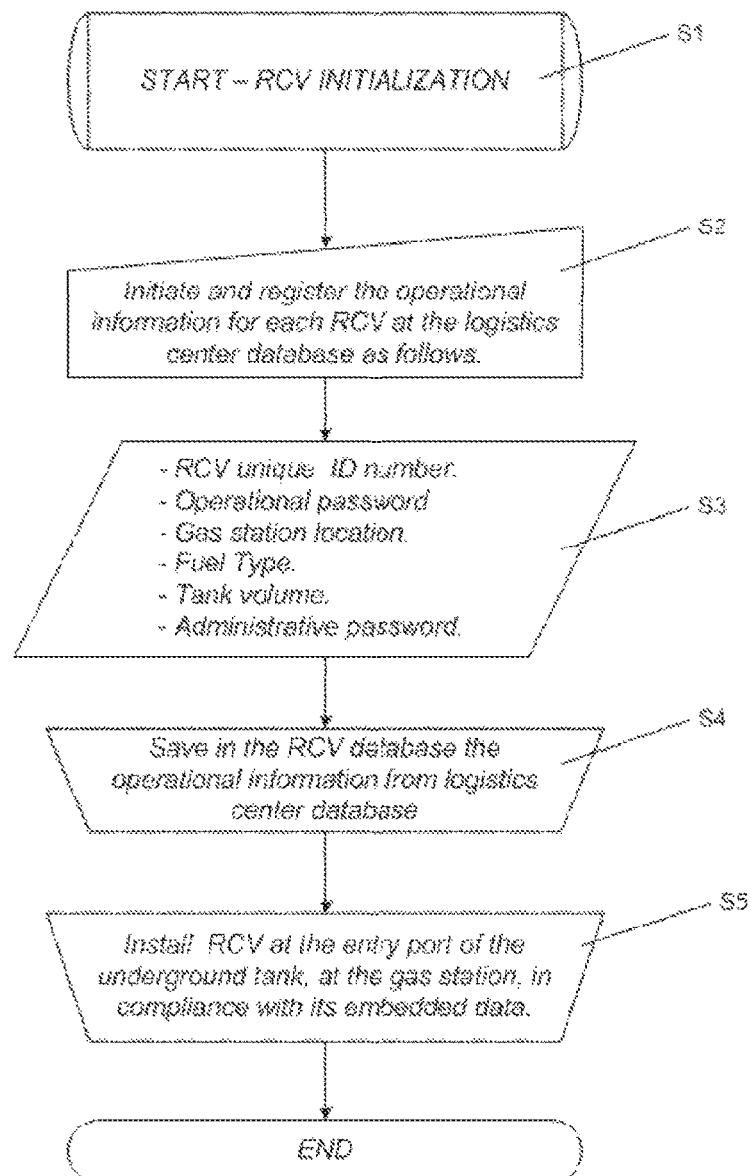
FIG. 2 is a flowchart describing the method and process for initializing and installing the RCV.

An RCV is prepared and installed in accordance with the process, method and computer program shown in FIG. 2. After initializing the RCV (S1), operational information for each RCV is registered in the logistics center database 300 (FIG. 1) (S2). The RCV is programmed with an RCV unique ID number, an operational password, gas station locations, fuel type, tank volume, and administrative password, etc. (S3). Subsequently, the operational information from the logistics center database is loaded in the RCV database (S4). The RCV is then installed at the entry port of the underground tank at the gas station in compliance with its embedded data (S5).

The RCV is mechanically compatible for integration with common top seal adaptors and is installed at the entry port of the fuel storage tank. After installation, access to the storage tank is blocked and can be opened only in response to an authorized CCU "Open" command.

Figure 3:
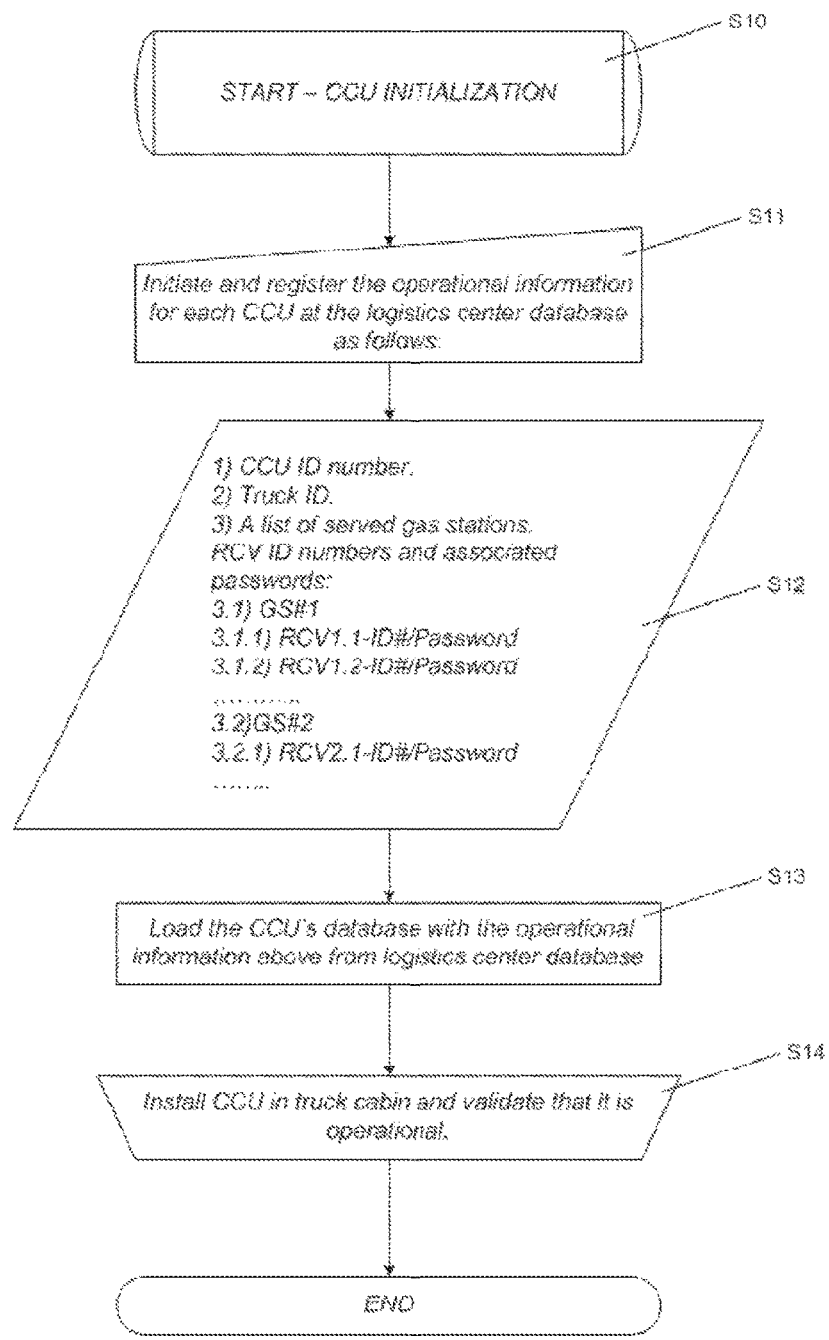
FIG. 3 is a flowchart describing the method and process for initializing and installing the CCU.

The CCU is initialized at the logistics center and installed in the tanker's cabin or in a mobile hand-held terminal. The preparation and implementation is achieved in accordance with the process, method and computer program shown in FIG. 3. CCU initialization is started in step S10, and the operational information for each CCU is registered in the logistics center database (S11). Operational data includes CCU ID number, truck ID, a list of served gas stations with RCV ID numbers and associated passwords, etc. (S12). The CCU's database is loaded with the operational information from the logistics center database (S13), and the CCU is installed in the truck cabin and operation is validated (S14).

The Logistics Center provides a unique identification code for each RCV and CCU. At the time of installation, the CCU is loaded with a list of gas stations' passwords where that tanker is certified for delivery. The passwords are loaded into the CCU's non-volatile memory and therefore protected against power failure.

Figure 4:
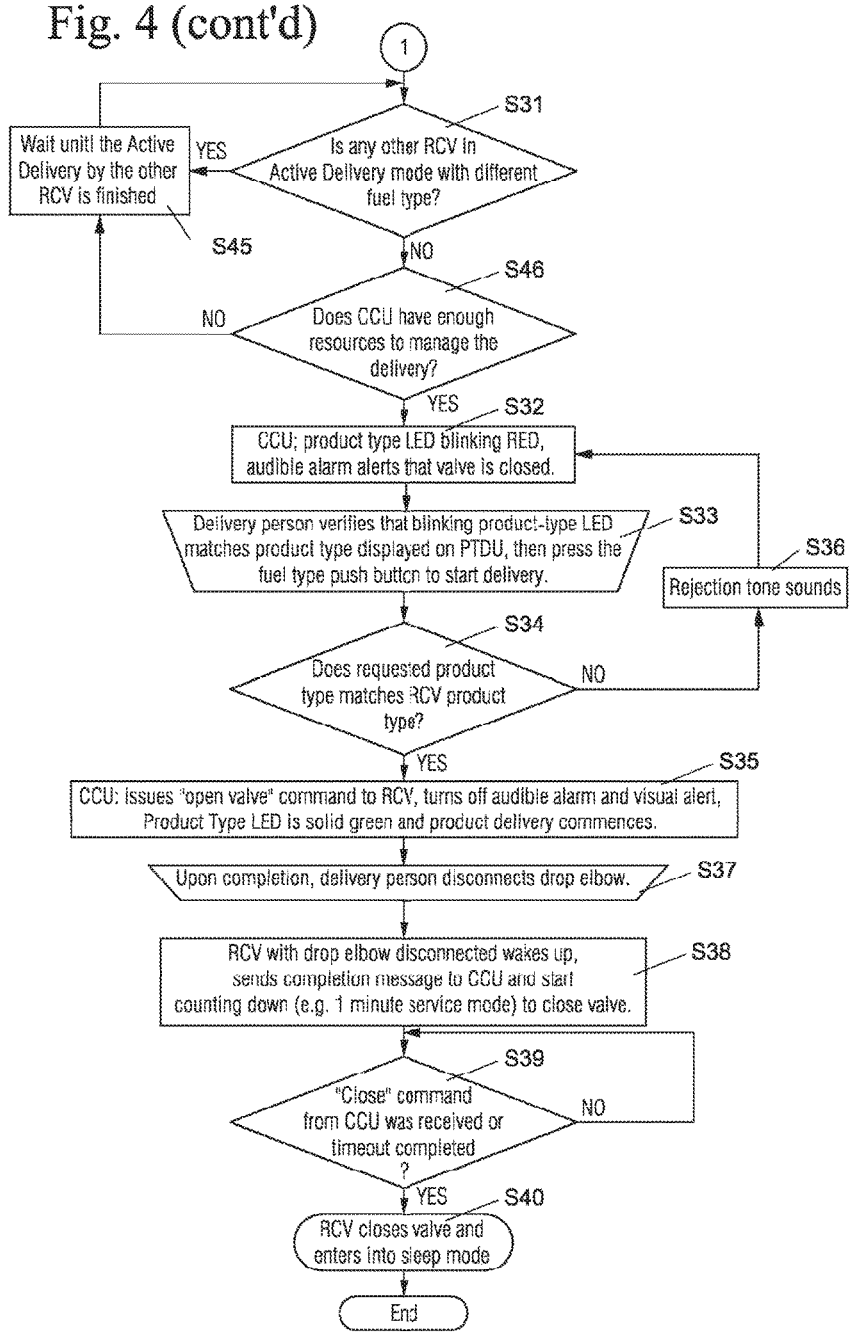
FIG. 4 is a flowchart describing the method and process for authorizing delivery of petroleum products at a retail gas station using the system of the described embodiments.

When at least one tanker and at least one liquid storage tank are installed, system operations can begin in accordance to the process shown in FIG. 4, which shows the step-by-step operational procedures of the invention.

CCU

Figure 9:
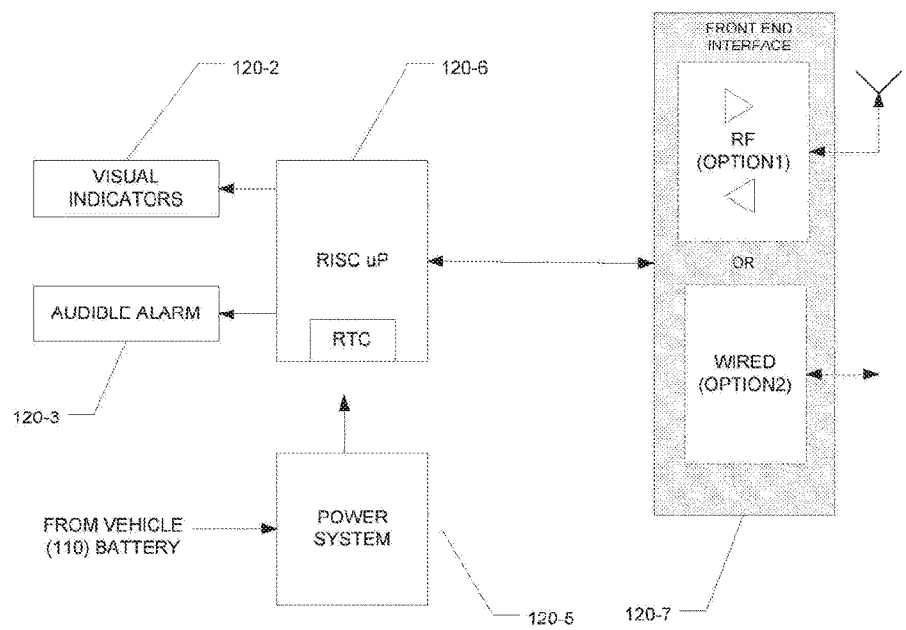
FIG. 9 is a block diagram of the CCU.

The CCU enables the delivery person to monitor and open RCVs at the time of fuel delivery. The delivery person can only open RCVs that are authorized for specific tanks at specific gas stations. The CCU is installed in the tanker truck's cabin in a way that is visible and conveniently accessible for the delivery person. FIG. 9 is a schematic block diagram of the CCU. The electronic circuitry is comprised of a Front End Interface 120-7 (RF or wired), RISC μP system 120-6 loaded with an operational program and database, a Power System 120-5, which receives its power from the tanker truck's battery; and a front panel that is comprised of visual indicators 120-2 and an audible alarm 120-3.

The CCU is turned on at the retail gas station. Once operational with a communications medium (RF or Wired)

in place, the CCU starts searching for RCVs, and the operational process proceeds according to FIG. 4.

PTDU

Figure 11:
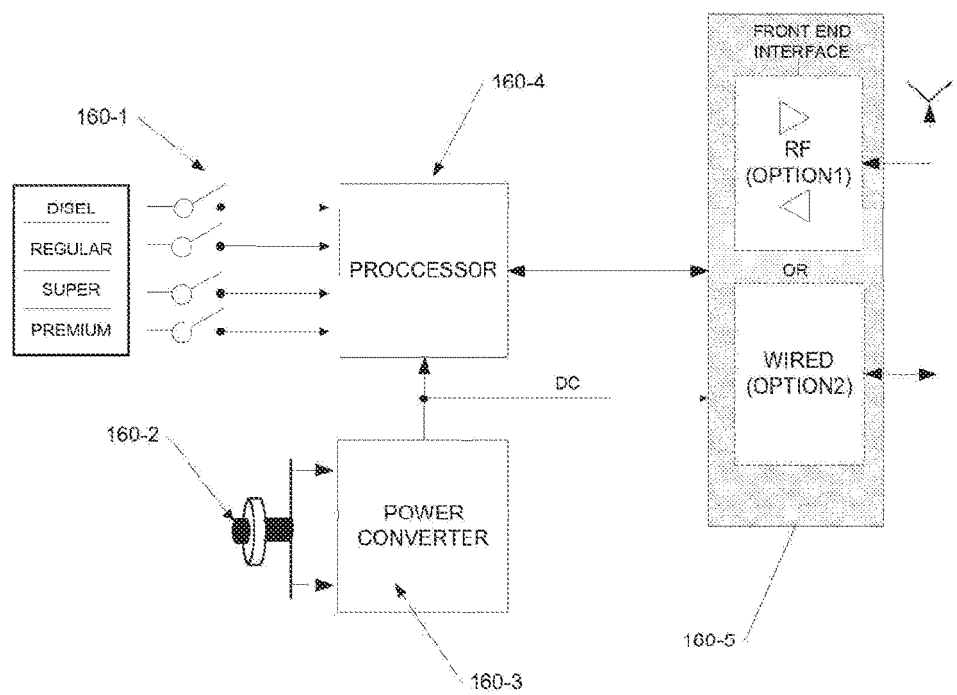
FIG. 11 is a block diagram of the PTDU.
Figure 12:
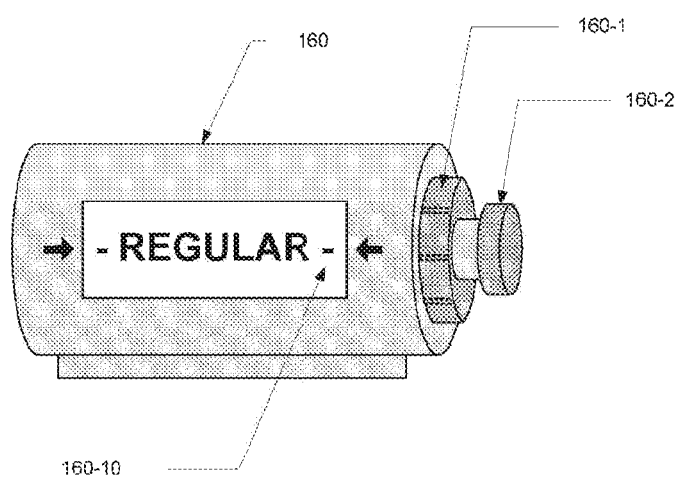
FIG. 12 is a schematic drawing of the PTDU.

The PTDU 160 (FIG. 11) is installed on the tanker truck next to each compartment dispensing port. The basic PTDU is a mechanical indicator, widely used today in the fuel delivery industry and set by the driver at the fuel depot to remind him the type of product that was loaded into the specific compartment. The PTDU discussed in this invention is an optional accessory to the CCU, and it is comprised of (1) a display 160-10 showing the product type stored in the linked compartment, (2) a selection knob 160-1 for selecting the product type to display at the time of product loading, and (3) a push button 160-2 via a power converter 160-3 that sends a command to the CCU to open or close the RCV along with the product type shown on the display. The CCU could also be implemented in a mobile hand-held device. Also, the fuel type push buttons can be installed at the PTDU, which is operationally convenient, and in which case it will constitute a "distributed" CCU.

RCV

The RCV is a low-power electromechanical valve system, controlled by an authorized CCU, and designed to work with petroleum products and other hazardous liquids. The RCV is installed at the entry port of an underground liquid storage tank. In the gas station application, it is installed inside a spill container 210-19, screwed in between the bottom of the spill container at one end and a top seal adaptor at the other end.

Figure 7:
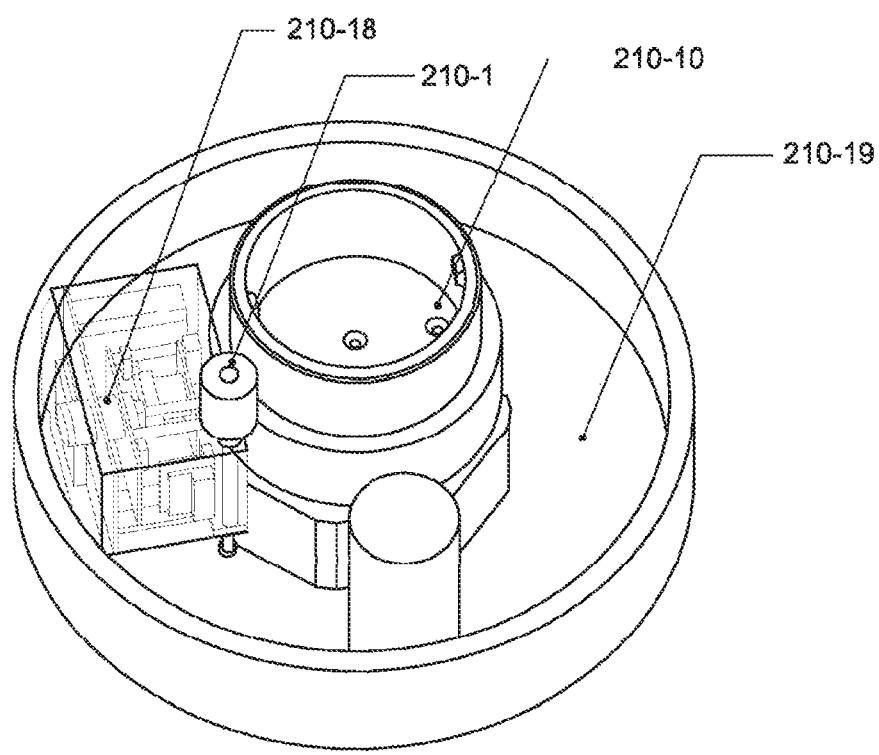
FIG. 7 is a physical view of the RCV installed in a spill container.
Figure 8:
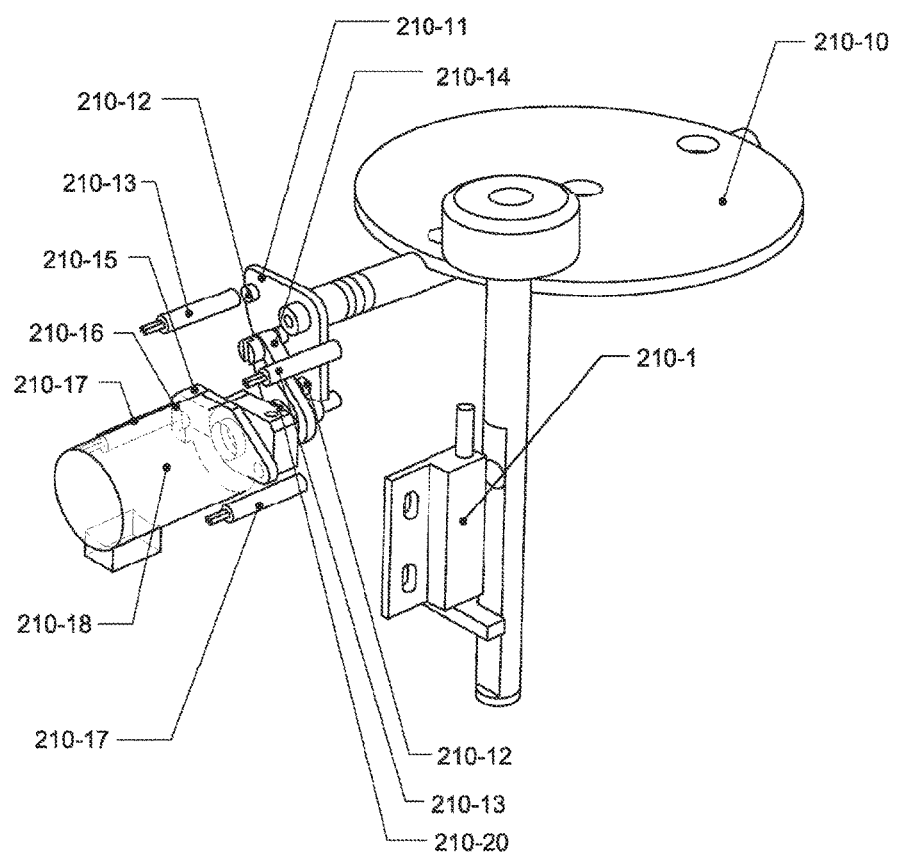
FIG. 8 is a detailed view of the RCV components and locking mechanism.
Figure 10:
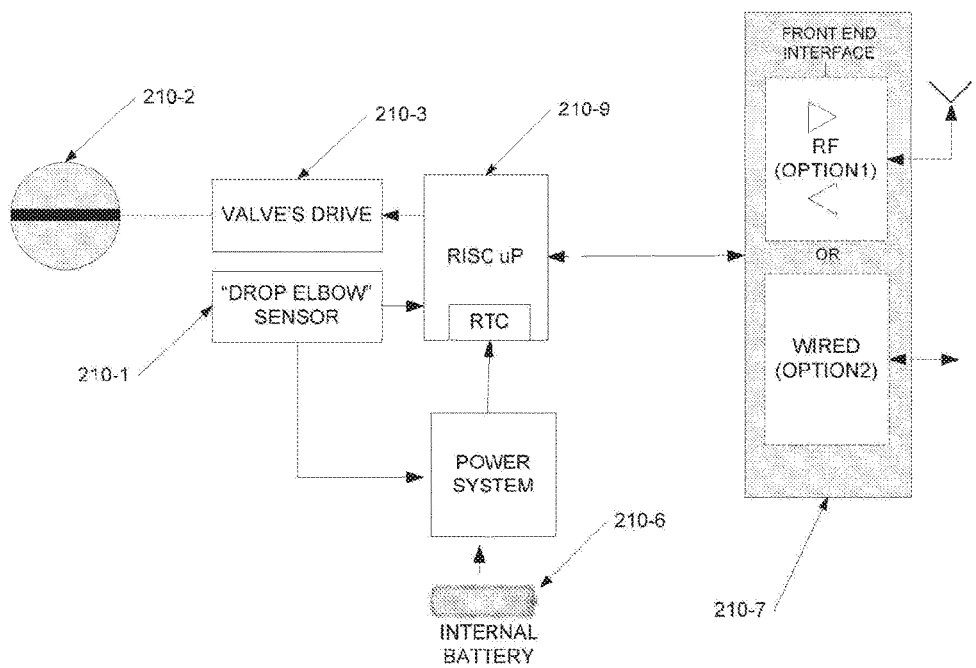
FIG. 10 is a block diagram of the RCV.

FIGS. 7 and 8 show the RCV's physical layout, and FIG. 10 is a schematic block diagram. The RCV's mechanical parts are comprised from a disk flap 210-10. The flap can be in an opened (90°) position or closed (0°) position (as shown in FIGS. 7 and 8). The flap is connected at its axis to a shaft or axle 210-11. The shaft provides a lock mechanism for the flap when it is in opened or closed positions and also has two magnets 210-12 that pull ferromagnetic read switches 210-13 to report that the flap is opened, closed or half way open. The shaft is moved by a cam 210-14 that is connected to a small electric motor 210-18 through a spring transmission 210-20 that preserves the energy in case of mechanical obstruction to the flap to allow the motor to shut down, while waiting for the mechanical obstruction to be removed. The axle 210-11 of the disk flap is secured to a cam plate 210-14, which includes a cam slot therein. A cam driver includes a cam pin disposed in the cam slot. The cam pin and slot arrangement serves to lock the disk flap in either the closed position or the opened position. A motor arm 210-15 is connected to the other side of the transmission spring and is also equipped with a magnet 210-16 that activates ferromagnetic read switches 210-17 to indicate a max position of the motor, and power to the motor can be shut down. In use, the cam driver is coupled with the motor via the spring transmission. The motor is operable to displace the spring transmission from a relaxed state to a compressed state regardless of a position of the disk flap. The spring transmission is configured such that a force of the spring transmission in the compressed state is sufficient to displace the disk flap from/to the opened position to/from the closed position.

With reference to FIG. 10, electronic parts of the RCV include an RF or wired Front End Interface 210-7, μP system 210-9 loaded with an operational program and database, and a valve 210-2, whose open/closed status is controlled by a low-power drive 210-3. The low power drive is activated by an electrical command sent from the RISC μP following a request from an authorized CCU. The RCV is powered by an internal battery 210-6.

Operational Process

The system has two modes of operations: (a) Delivery Mode and (b) Service mode. In the delivery mode, the RCV's drop elbow sensor 210-1 detects a drop elbow 150 attached to the top seal adaptor for more than few seconds steadily. The RCV internal circuitry is activated, and the system attempts to establish communication with the CCU. The delivery process is performed according to FIG. 4 (described below).

In the service mode, the valve may be opened for a limited time for maintenance purposes, e.g., measuring liquid level using a measuring rod. The maintenance person will have a service version of the CCU that would allow opening the valve for a short time. The service mode operational process is described in FIG. 4.

Valve

The valve is normally closed, with liquid flow blocked. No power is required to hold the valve in this position. The valve is bi-directional for liquid flow. A closed valve, however, is capable to allow controlled leakage into the underground. This can be accomplished by the size and/or shape of the valve relative to the product entry port. This capability is required to allow a return of a fuel sample taken for analysis purposes, without requiring opening the valve. This rate of controlled leakage should be low enough to cause no product mixing issues in the delivery mode if by mistake somebody is trying to deliver the wrong fuel type.

Figure 5:
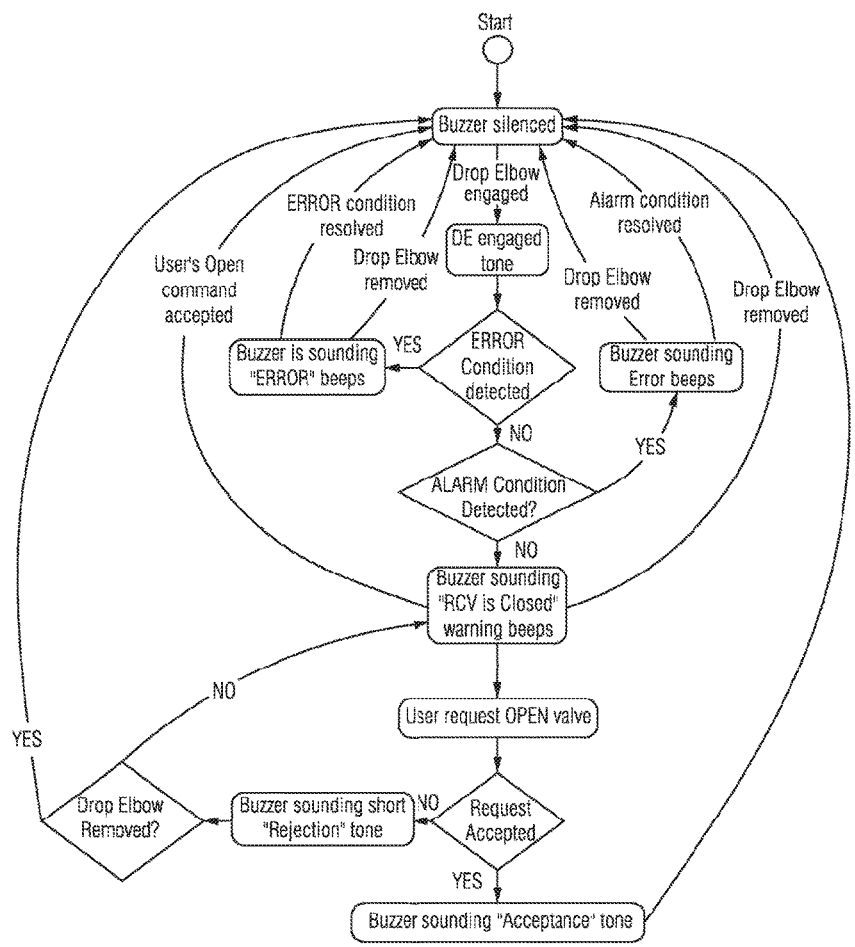
FIG. 5 is an authorized delivery audible alerts state diagram.
Figure 6:
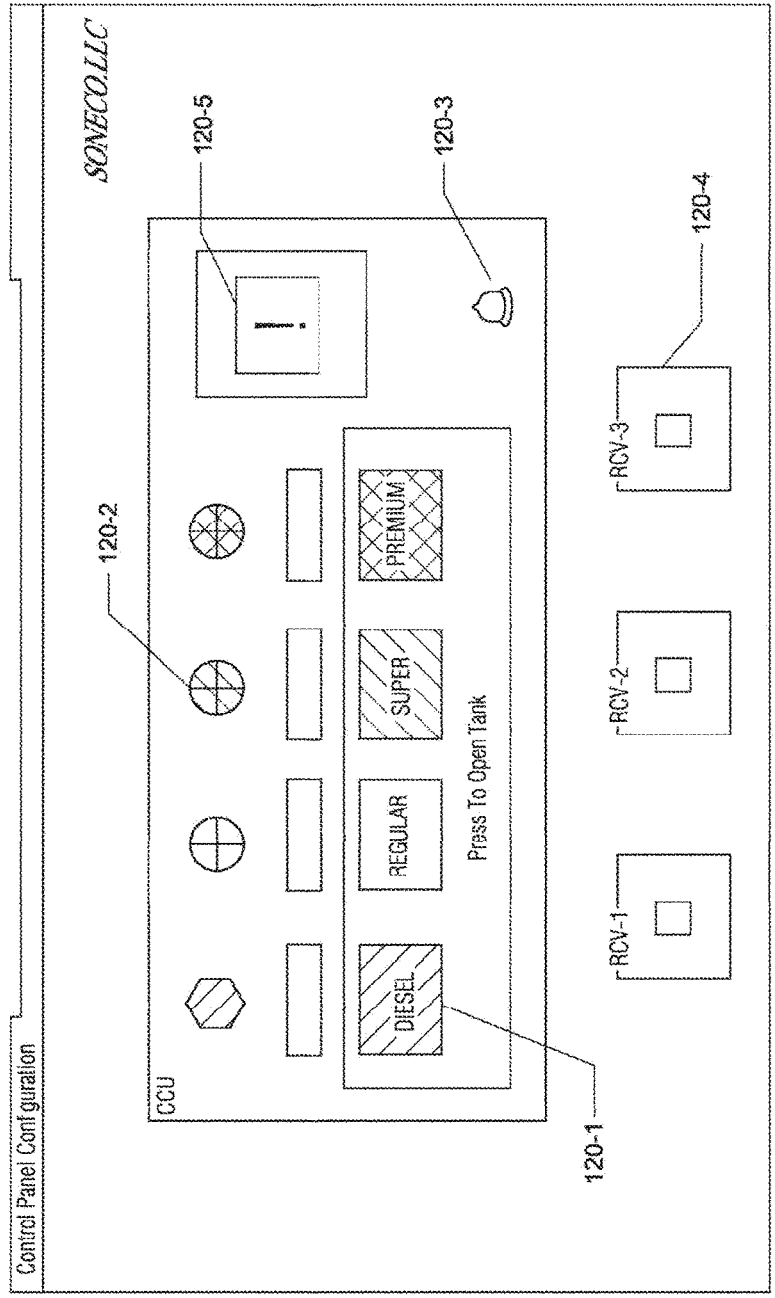
FIG. 6 is a front-panel illustration CCU.

FIGS. 4 and 5 show operational processes relating to product delivery with the system of the described embodiments. With reference to FIG. 4, delivery is started in step S20, and a tanker truck 100 arrives at the gas station with a delivery order and parks next to the station's fuel tank entry ports (S21). The delivery person uncovers and connects the vapor return port to the tanker vapor return port (S22). The storage tank entry port is uncovered, the cap is removed, and the drop elbow is connected to the top seal adapter to connect the 4" hose 140 between the tanker's compartment API and top seal adapters (S23). If the RCV senses the drop elbow transition (YES in S24), the RCV with drop elbow connected enters into active mode and sends its location and ID to the CCU (S25). After receiving the RCV's location and ID, if the RCV is on the CCU's authorized list (YES in S26), the CCU sends the location's password to the RCV (S27). If the RCV is not on the CCU's authorized list (NO in S26), the RCV returns to sleep mode (S28), and the process returns to step S24. In step S24, if the RCV does not detect the drop elbow transition (NO in S24), the RCV remains closed, and its electronic circuitry stays in sleep mode (S29). The system then waits until the drop elbow transition is detected.

The RCV determines whether the password from the CCU is correct, and if so (YES in S30), the system determines whether a time period that the drop elbow switch was on was less than a preset period, e.g., 3 seconds (S42). If so, (YES in S42), the system opens the valve in the service mode (S43) and closes the valve (S44) if the drop elbow switch is on or if the service mode time delay has passed. If the time period that the drop elbow switch is on is long (NO in S42), the system checks whether any other RCV is in active delivery (S31) with a fuel type that is different from the one requested by the CCU (the system can allow for more than one delivery at the same time if the fuel type (or product) of the second delivery is identical to the active delivery and also assuming that the CCU has an additional fuel type indicator and push button (i.e., "resources") for that type of fuel). If so (YES in S31), the system waits until the active delivery for the other RCV is completed (S45). If the password is incorrect (NO in S30), the process returns to step S28, and the RCV returns to sleep mode. If there are no other RCVs in active delivery (NO in S31), the system checks whether the CCU has enough resources to manage the delivery (S46). If not (NO in S46), the process goes to step S45, and if so (YES in S46), the CCU display blinks a product type LED red, and an audible alarm alerts that the RCV is closed (S32). The delivery person verifies that the blinking product-type LED matches the product type displayed on the PTDU and presses the fuel type pushbutton to start delivery (S33). If the requested product type matches the RCV product type (YES in S34), the CCU issues an "open valve" command to the RCV, turns off the audible alarm and visual alert, turns the product type LED to solid green, and product delivery commences (S35). If the requested product type does not match the RCV product type (NO in S34), a rejection tone sounds (S36) and the process returns to step S32.

Upon completion of delivery, the delivery person disconnects the drop elbow (S37). With the drop elbow disconnected, the RCV wakes up and sends a completion message to the CCU and begins a countdown (e.g., one minute) to close the valve (S38). If a "close" command from the CCU is received or the countdown limit is completed (YES in S39), the RCV is closed and enters the sleep mode (S40). The system waits for a "close" command from the CCU or completion of the time out period. In step S41, the system checks whether a drop elbow is connected, and if not (NO in S41), delivery is complete. If a drop elbow is connected (YES in S41), the process returns to step S25.

FIG. 5 illustrates operational processes relating to alert sounds by the CCU to notify the delivery person on exceptions that occur during the unloading process. As shown, several conditions will activate the alarm, and the alarm may be provided with varying tones to signify different errors, problems or successes. For example, with reference to FIG. 5, with a drop elbow engaged, the alarm may sound a drop elbow engaged tone. An error tone may be sounded if an error condition is detected, and an alarm tone may be sounded if an alarm condition is detected. The alarm may similarly include warning beats when the RCV is closed with the drop elbow engaged. After a user requests that the valve be opened, if the request is accepted, the alarm can sound an "acceptance" tone; otherwise, the alarm can sound a "rejection" tone. At that time, if the drop elbow is removed, the buzzer/alarm is silenced. If the drop elbow remains detected, the RCV closed warning beeps continue until an open valve request is accepted.

The CCU is also designed to collect RCV maintenance and operational status at the station and will store that data in its internal memory to support product maintenance.

The invention and the operational process described above result in increased distributor revenue, improved product quality, the elimination of improper-product delivery, and insurance cost savings.

The described system serves to prevent the unauthorized delivery of product, allow authorized delivery, and control the flow of product at the entry port of a bulk storage tank. The system prevents an unauthorized delivery vehicle that is hauling a product from loading or unloading cargo while enabling an authorized delivery vehicle to unload or load authorized cargo with minimal interruption. The described embodiments are most preferably deployed in the area of fuel distribution, but the embodiments are equally applicable to any other product that involves controlling the transfer of product into or out of a bulk storage tank and a delivery vehicle, such as a tanker truck or rail car.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A method of preventing contamination by a tanker truck in a bulk liquid storage tank, the method comprising:
   (a) positioning an identification transmitter at an entry port of the bulk liquid storage tank, the identification transmitter storing an indication of a storage product type in the bulk storage tank;
   (b) communicating a delivery product type in the tanker truck to control circuitry in the tanker truck;
   (c) the identification transmitter communicating the storage product type to the control circuitry; and
   (d) the control circuitry comparing the delivery product type with the storage product type and controlling delivery based on a result of the comparison.

2. A method according to claim 1, wherein the identification transmitter comprises a remote controlled valve (RCV), wherein the entry port is closed by the RCV.

3. A method according to claim 2, further comprising, prior to step (d), detecting a drop elbow attached to the RCV, and then, establishing the communication between the RCV and the control circuitry.

4. A method according to claim 3, wherein after establishing the communication between the RCV and the control circuitry, the method comprises the control circuitry communicating a password to the RCV.

5. A method according to claim 4, further comprising the control circuitry issuing an open valve command to the RCV when the delivery product type matches the storage product type, and displacing the RCV to an open position for delivery.

6. A method according to claim 1, wherein step (b) is practiced wirelessly.

7. A method according to claim 1, further comprising preventing delivery when the delivery product type does not match the storage product type in step (d).

8. A method according to claim 7, further comprising sounding an alarm when the delivery product type does not match the storage product type in step (d).

9. A system for preventing contamination by a tanker truck in a bulk liquid storage tank, the system comprising:
   an identification transmitter positioned adjacent an access to the bulk liquid storage tank, the identification transmitter being configured to store an indication of a storage product type in the bulk storage tank;
   a drop elbow connecting the tanker truck to the liquid storage tank, wherein the identification transmitter includes a sensor that is configured to identify when the drop elbow has been connected; and
   control circuitry communicating with the identification transmitter, the control circuitry being configured to identify a delivery product type in the tanker truck and to compare the delivery product type in the tanker truck with the storage product type, wherein the control circuitry is configured to control delivery of the delivery product type based on a result of the comparison.

10. A system according to claim 9, wherein the identification transmitter is disposed adjacent an entry port of the bulk liquid storage tank.

* * * * *